United States Patent
Araki et al.

(10) Patent No.: US 10,169,085 B2
(45) Date of Patent: Jan. 1, 2019

(54) DISTRIBUTED COMPUTING OF A TASK UTILIZING A COPY OF AN ORIGINAL FILE STORED ON A RECOVERY SITE AND BASED ON FILE MODIFICATION TIMES

(71) Applicant: International Business Machines Corporation, Armonk, NY (US)

(72) Inventors: Hiroshi Araki, Yokohama (JP); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/841,862

(22) Filed: Dec. 14, 2017

(65) Prior Publication Data

US 2018/0091409 A1    Mar. 29, 2018

Related U.S. Application Data

(63) Continuation of application No. 15/262,468, filed on Sep. 12, 2016.

(51) Int. Cl.
*G06F 15/16*         (2006.01)
*G06F 9/50*          (2006.01)
(Continued)

(52) U.S. Cl.
CPC ........ *G06F 9/5005* (2013.01); *G06F 11/1451* (2013.01); *G06F 11/1464* (2013.01);
(Continued)

(58) Field of Classification Search
CPC . H04L 43/0888; H04L 43/0894; H04L 43/50; H04L 67/06; H04L 67/10;
(Continued)

(56) References Cited

U.S. PATENT DOCUMENTS 9,317,380 B2   4/2016  Mahindru et al.
9,336,103 B1   5/2016  Hasbe et al.
(Continued)

FOREIGN PATENT DOCUMENTS

WO    2016039784 A1    3/2016

OTHER PUBLICATIONS

Araki et al. "Distributed Computing Utilizing a Recovery Site", U.S. Appl. No. 15/262,468, filed Sep. 12, 2016.
(Continued)

*Primary Examiner* — Lance Leonard Barry

(74) *Attorney, Agent, or Firm* — Stosch Sabo

(57) ABSTRACT

A recovery site is configured to process a task using a copy of an original file associated with the task. The original file is stored on a production site, and a copy of the original file is stored on a recovery site. The task is determined to be suitable for processing on the recovery site based on the task comprising reading the file, the task completable without user input, the task not requiring a physical location for processing, and the task not altering the copy of the original file. The original file is determined to match the copy of the original file based on a modification time associated with the original file being earlier than a copy time associated with the copy of the original file. The task is processed on the recovery site using the copy of the original file, and at least one result file is output.

1 Claim, 6 Drawing Sheets

(51) Int. Cl.
*G06F 11/14* (2006.01)
*H04L 29/08* (2006.01)

(52) U.S. Cl.
CPC ...... *G06F 11/1469* (2013.01); *G06F 11/1471* (2013.01); *H04L 67/327* (2013.01); *G06F 2201/805* (2013.01); *G06F 2201/845* (2013.01)

(58) Field of Classification Search
CPC ...... G06F 9/5005; G06F 9/5027; G06F 9/505; G06F 11/1469; G06F 11/1464; G06F 11/1471; G06F 11/1451; G06F 2201/805; G06F 2201/845
See application file for complete search history.

(56) References Cited

U.S. PATENT DOCUMENTS

| | | | |
|---|---|---|---|
| 9,672,122 B1* | 6/2017 | Gandhi | G06F 11/1425 |
| 2011/0246813 A1 | 10/2011 | Collier et al. | |
| 2013/0179289 A1 | 7/2013 | Calder et al. | |
| 2015/0154085 A1 | 6/2015 | Iwasaki et al. | |
| 2016/0241450 A1* | 8/2016 | Iimura | G06F 11/203 |
| 2016/0357643 A1 | 12/2016 | Bachu et al. | |

OTHER PUBLICATIONS

List of IBM Patents or Patent Applications Treated as Related, dated Dec. 14, 2017, 2 pages.

* cited by examiner

DISTRIBUTED COMPUTING OF A TASK UTILIZING A COPY OF AN ORIGINAL FILE STORED ON A RECOVERY SITE AND BASED ON FILE MODIFICATION TIMES

This application claims priority to U.S. patent application Ser. No. 15/262,468 filed on Sep. 12, 2016 and all the benefits accruing therefrom, the contents of which are herein incorporated by reference.

BACKGROUND

The present disclosure relates to distributed computing, and, more specifically, to distributed computing performed on a disaster-recovery site.

Disaster-recovery sites can be used to store copies of original data. Updated copies of the original data can be created at respective time intervals. The original data can be stored on a production site. The original data stored on a production site can be modified and/or used to execute processing tasks.

SUMMARY

Aspects of the present disclosure are drawn to a computer-implemented method comprising receiving a request to perform a task indicating at least a first file used to perform the task. The first file can be modified at a first update time and can be stored on a production site comprising hardware resources configured to store original data and process tasks associated with the original data. A first copy of the first file can be created at a first copy time and can be stored on a recovery site comprising hardware resources configured to store copies of the original data and process tasks associated with the copies of the original data. The computer-implemented method can further comprise determining the task is a candidate for processing on the recovery site and determining the first file and the first copy of the first file match by determining the first update time is earlier than the first copy time. The computer-implemented method can further comprise performing the task using resources of the recovery site and using the first copy of the first file stored on the recovery site in response to determining that the first file and the first copy of the first file match and outputting a result file in response to performing the task.

Further aspects of the present disclosure are drawn to a system comprising a memory and a processor communicatively coupled to the memory. The memory can store a task database identifying respective execution programs configured to execute respective tasks. The processor can be configured to receive a request to process a task associated with a task name and indicating at least a first file that is used to process the task, wherein the first file is stored on a first compute node of a first set of compute nodes and is updated at a first update time, and wherein at least a first copy of the first file is stored on a second compute node of a second set of compute nodes at a first copy time. The processor can be further configured to determine the task is a candidate for distributed processing using resources associated with the second set of compute nodes and determine the first file and the first copy of the first file match by determining the first update time is earlier than the first copy time. The processor can be further configured to retrieve, in response to determining that the first file and the first copy of the first file match, a target execution program from the task database using the task name, where the target execution program is configured to execute the task associated with the task name. The processor can be further configured to instruct the second set of compute nodes to process the task by executing the target execution program using the first copy of the first file stored on the second compute node and output at least one result file responsive to processing the task.

Further aspects of the present disclosure are drawn to a computer program product comprising a computer readable storage medium having program instructions embodied therewith, where the computer readable storage medium is not a transitory signal per se. The program instructions can be executed by a processor to cause the processor to perform a method comprising receiving a request from an application to process a task, where the request indicates at least a first file used to process the task. The first file can be stored on a production site and can be updated at a first time. A first copy of the first file can be stored on a recovery site at a second time. The production site and the recovery site can comprise hardware configured to store data and process tasks. The program instructions can be further configured to cause the processor to perform a method further comprising determining that the first file matches the first copy of the first file by determining that the first time is earlier than the second time and issuing, in response to determining that the first file matches the first copy of the first file, a distributed processing request indicating the task and a file path to the first copy of the first file stored on the recovery site. The program instructions can be further configured to cause the processor to perform a method further comprising loading the result file from the recovery site to the production site in response to receiving a location to a result file stored on the recovery site and generated by processing the task and outputting an indication to the application that the task has been completed.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
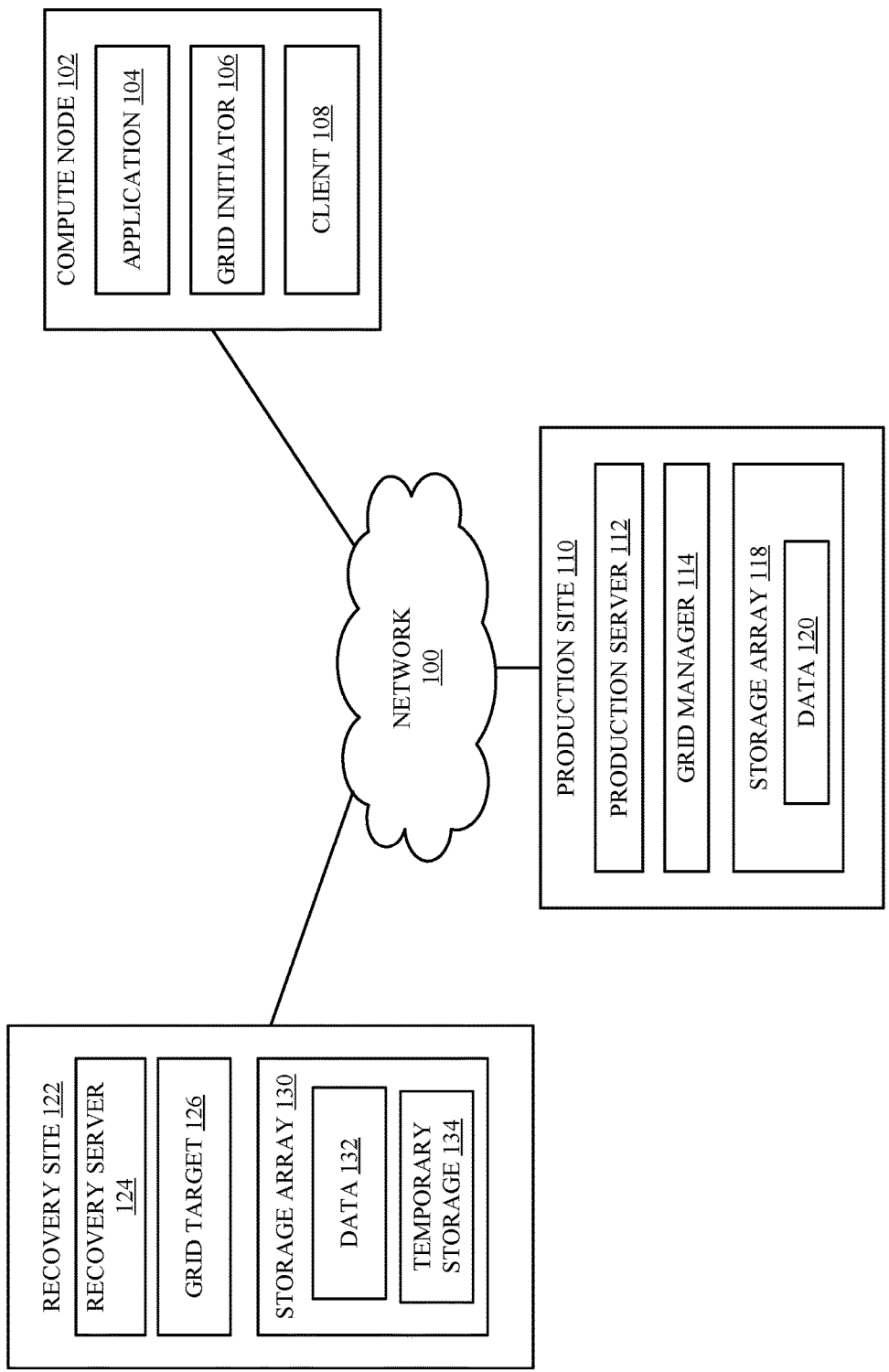
FIG. 1 illustrates a block diagram of an example network that can implement some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to configuring resources associated with one or more servers of a recovery site (also referred to as a disaster-recovery site or a backup site) to execute tasks otherwise executed in a production site. As is understood by one of skill in the art, a recovery site can store copies of original data, and a production site can store the original data. Aspects of the present disclosure can select suitable processing tasks for execution using the resources of the recovery site. Aspects of the present disclosure can determine if a file stored on a production site and used to process a task matches a copy of the file stored on the recovery site. In the event the files match, then the task can be processed using resources on the recovery site and the copy of the file stored on the recovery site.

Advantageously, aspects of the present disclosure can increase the utilization (e.g., utilized processing capacity divided by the total processing capacity) of a recovery site by utilizing processing resources and data available on the recovery site that is otherwise used exclusively for storage of copied data. Furthermore, aspects of the present disclosure can improve processing performance of the recovery site by selectively choosing tasks to execute on the recovery site that are suitable for the resources and data available on the recovery site. For example, aspects of the present disclosure verify that data used to execute tasks on the recovery site matches data stored in the production site. It is to be understood that the aforementioned advantages are example advantages and embodiments of the present disclosure exist which can contain all, some, or none of the aforementioned advantages while remaining within the spirit and scope of the present disclosure.

Referring now to the figures, FIG. 1 illustrates a block diagram of a network 100 in which some embodiments of the present disclosure can be implemented. The network 100 communicatively couples compute node 102, production site 110, and recovery site 122 to one another. Compute node 102 can comprise a server, workstation, laptop, user device, mobile device, and/or other devices. Compute node 102 can contain application 104, grid initiator 106, and Client 108. Client 108 can comprise, for example, a common internet file system (CIFS) client or a network file system (NFS) client and can be configured to share files between the compute node 102, the production site 110, and the recovery site 122. Although a single client 108 is shown, a respective client 108 can be located on each of the compute node 102, production site 110, and recovery site 122 according to some embodiments.

Application 104 can be a program configured to execute processing tasks according to instructions. Application 104 can be, for example, a word processor, a spreadsheet, a web browser, a media editor, a game, and so on. A task can comprise a function performed on a portion of data according to a set of instructions from the application 104. For example, a task can comprise executing an algorithm on data stored in a file and outputting the result of the executed algorithm in a result file. Tasks can be made of up one or more sub-tasks. In accordance with some embodiments of the present disclosure, when application 104 attempts to execute a processing task, grid initiator 106 issues a distributed processing request to grid manager 114 on production site 110 via network 100 to determine if the processing should be executed on the production site 110 or the recovery site 122. Grid initiator 106 is discussed in more detail hereinafter with respect to FIG. 4.

Production site 110 can contain one or more production servers 112, grid manager 114, and storage array 118. In some embodiments, production site 110 comprises one or more compute nodes. Storage array 118 contains hardware configured to store data such as data 120. Data 120 is original data associated with application 104. Production server 110 can provide additional functionality to storage array 118, such as creating and maintaining a file system and providing CIFS/NFS server communication with compute node 102 and recovery site 122. Grid manager 114 can receive a distributed processing request from grid initiator 106 and determine if a task identified in the distributed processing request is suitable for processing on the recovery site 122. Grid manager 114 can determine if a task is suitable for processing on recovery site 122 by reviewing characteristics of the task and determining if files associated with the task match between the production site 110 and the recovery site 122. For example, grid manager 114 can determine a task is suitable for processing on the recovery site 122 by identifying one or more of the following characteristics of the task: the task does not require user input to complete the task, the task does not define a physical location to execute the task, the task does not alter the one or more files associated with the task, and the task can be completed by reading a file and generating a result file based on the file. Grid manager 114 can thus identify tasks that are eligible for processing on recovery site 122 and tasks that are ineligible for processing on recovery site 122. Grid manager 114 is discussed in more detail hereinafter with respect to FIG. 3.

Recovery site 122 can contain one or more recovery servers 124, grid target 126, and storage array 130. In some embodiments, recovery site 122 comprises one or more compute nodes. Recovery server 124 can provide additional functionality to storage array 130, such as creating and maintaining a file system and providing CIFS/NFS server communication with compute node 102 and production site 110. Storage array 130 can contain data 132. Data 132 can comprise copies of data 120 stored in production site 110. Recovery site 122 can be configured to copy portions of data 120 from production site 110 to storage array 130 at predetermined time intervals, in response to user input, and/or in response to other criteria (e.g., a power spike on production site 110 may indicate abnormal system behavior and automatically trigger a backup function that copies data 120 to recovery site 122). Storage array 130 further comprises temporary storage 134 that can be used to store intermediate files and/or result files generated as a result of processing a task on recovery site 122. Grid target 126 can be configured to execute a distributed processing request received from, for example, grid initiator 106 or grid manager 114 using data 132. Grid target 126 is discussed in more detail hereinafter with respect to FIG. 5.

Although grid initiator 106, grid manager 114, and grid target 126 are shown on separate locations of the network 100, grid initiator 106, grid manager 114, and grid target 126 can also exist on a same location in, for example, a distributed computing manager which can be communicatively coupled to network 100 via compute node 102, production site 110, recovery site 122, or as its own entity. A distributed computing manager is described in more detail hereinafter with respect to FIG. 2.

Figure 2:
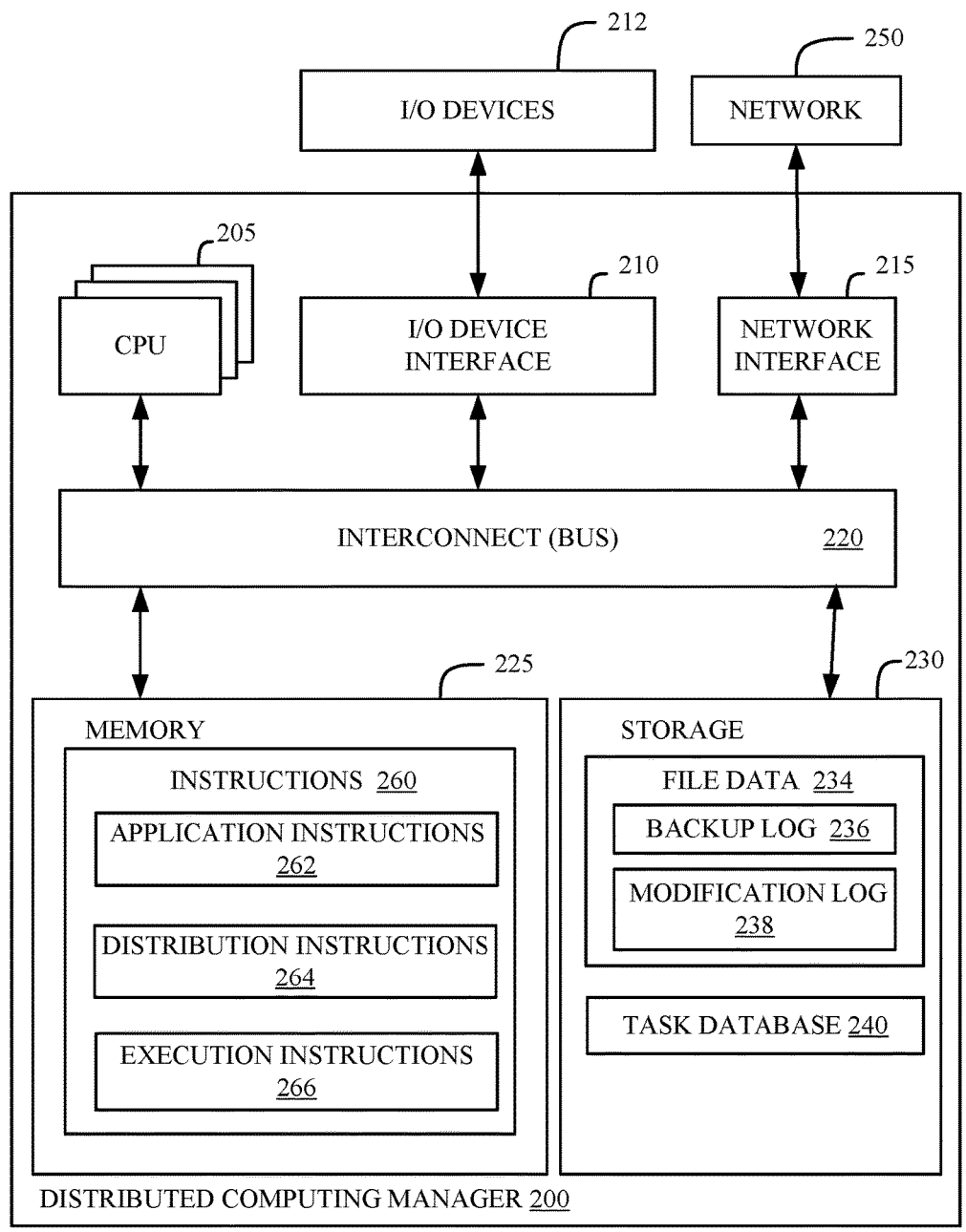
FIG. 2 illustrates a block diagram of an example distributed computing manager in accordance with some embodiments of the present disclosure.

Referring now to FIG. 2, illustrated is a block diagram of a distributed computing manager 200 in accordance with some embodiments of the present disclosure. In some embodiments, the distributed computing manager 200 contains instructions for any one, or any combination of grid initiator 106, grid manager 114, and/or grid target 126 of FIG. 1. In some embodiments, distributed computing manager 200 performs operations in accordance with FIGS. 3-6 as described in further detail hereinafter. The distributed computing manager 200 can include a memory 225, storage 230, an interconnect (e.g., BUS) 220, one or more processors 205 (also referred to as CPUs 205 herein), an I/O device interface 210, I/O devices 212, and a network interface 215.

Each CPU 205 retrieves and executes programming instructions stored in the memory 225 or storage 230. The interconnect 220 is used to move data, such as programming instructions, between the CPUs 205, I/O device interface 210, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the distributed computing manager 200 via the I/O devices 210 or a communication network 250 via the network interface 215.

In some embodiments, the memory 225 stores instructions 260 and the storage 230 stores file data 234 and task database 240. However, in various embodiments, the instructions 260, the file data 234, and the task database 240 are stored partially in memory 225 and partially in storage 230, or they are stored entirely in memory 225 or entirely in storage 230, or they are accessed over a network 250 via the network interface 215.

Storage 230 contains file data 234 and task database 240. File data 234 stores backup log 236 and modification log 238. Backup log 236 stores copy times for respective copies of original files (e.g., copied data 132 in recovery site 122 that is copied from original data 120 of production site 110 of FIG. 1). A copy time can refer to a start time corresponding to copying a portion of data from a production site to a recovery site. Modification log 238 stores modification times (also referred to as update times herein) for original files. Modification times can refer to a time a file was updated to create a current version of the file (e.g., times files in data 120 of production site 110 were last modified). Although backup log 236 and modification log 238 are shown on distributed computing manager 200, they can also be located on a production site (e.g., production site 110 of FIG. 1) and/or on a recovery site (e.g., recovery site 122 of FIG. 1) and connected to the distributed computing manager 200 via the network 250.

Task database 240 maps a name of respective tasks to respective programs configured to execute the respective tasks. Although task database 240 is shown in storage 230 of distributed computing manager 200, task database 240 can also be located on a compute node, a production site, or a recovery site (e.g., compute node 102, production site 110, or recovery site 122 of FIG. 1). In embodiments, task database 240 stores a small amount of data which may promote efficient processing associated with the data. For example, task database 240 can store less than one gigabyte of data in some embodiments.

The instructions 260 store processor executable instructions for various methods such as the methods shown and described hereinafter with respect to FIGS. 3-6. The instructions can include application instructions 262, distribution instructions 264, and execution instruction 266.

Application instructions 262 store processor executable instructions for issuing a distributed processing request based on a processing request received from an application. In some embodiments, application instructions 262 perform a similar function as grid initiator 106 of FIG. 1. Application instructions 262 are described in further detail hereinafter with respect to FIG. 4.

Distribution instructions 264 store processor executable instructions for determining if a task is suitable for processing on a recovery site. Distribution instructions 264 can determine if a task meets specific criteria to be executed on a recovery site. Distribution instructions 264 can further determine if a copied file stored on a recovery site and used to execute a processing task matches an original file stored on a production site by querying backup log 236 and modification log 238 and determining if a modification time of the original file is earlier than a copy time of the copied file. In some embodiments, distribution instructions 264 perform a similar function to grid manager 114 of FIG. 1. Distribution instructions 264 are described in further detail hereinafter with respect to FIG. 3.

Execution instructions 266 store processor executable instructions configured to execute a processing task using resources on a recovery site and using one or more copies of one or more original files stored on the recovery site. In some embodiments, execution instructions 266 are consistent with grid target 126 as shown and described with respect to FIG. 1. Execution instructions 266 are described in greater detail hereinafter with respect to FIG. 5.

In various embodiments, the I/O devices 212 can include an interface capable of presenting information and receiving input. For example, I/O devices 212 can receive input from a user and present information to a user interacting with an application (e.g., application 104) on a workstation (e.g., compute node 102).

In some embodiments, the network 250 is consistent with network 100 of FIG. 1. The network 250 can connect the distributed computing manager 200 with a workstation (e.g., compute node 102), a production site (e.g., production site 110), and a recovery site (e.g., recovery site 122).

Figure 3:
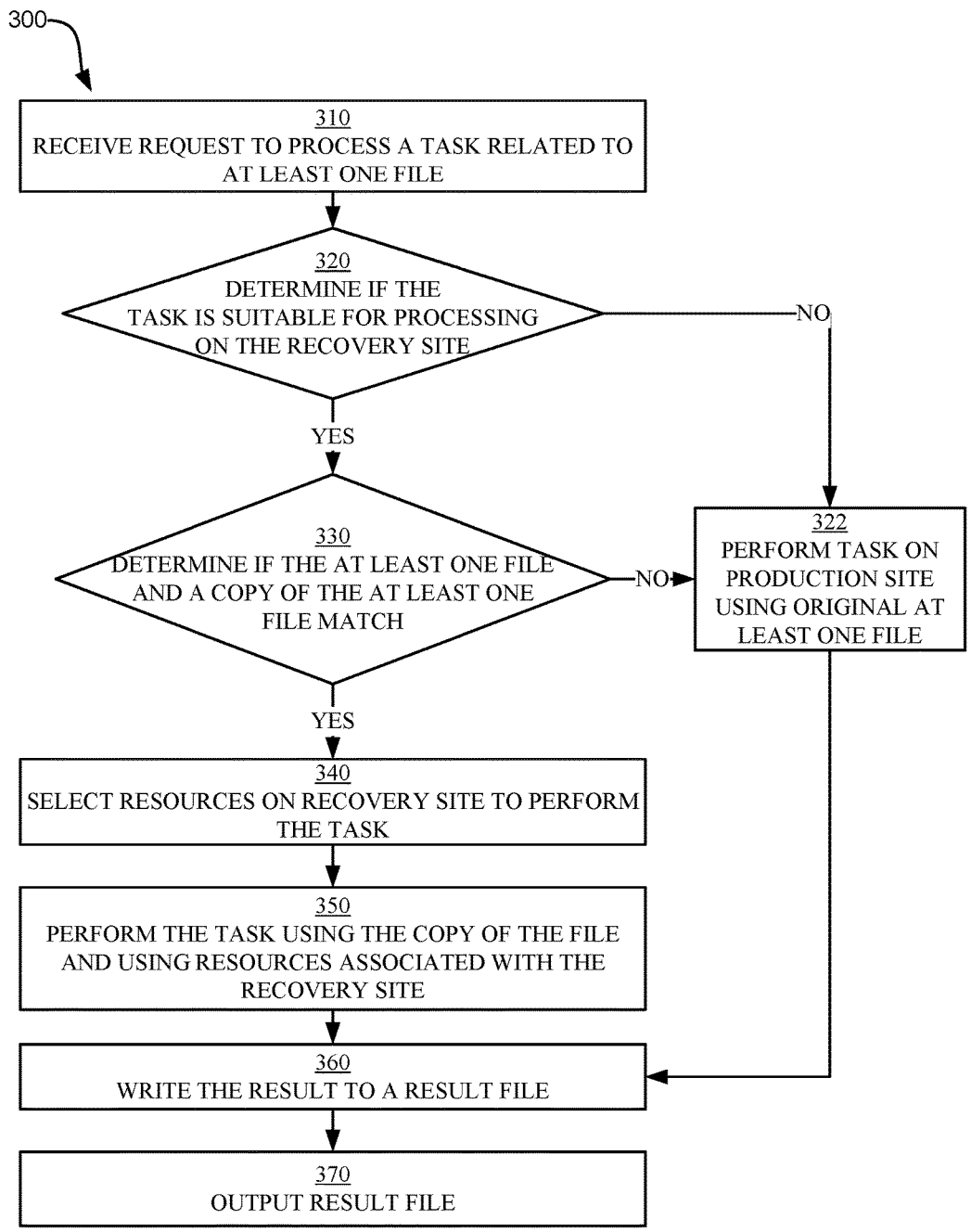
FIG. 3 illustrates an example flowchart for determining if a task is eligible for processing using a recovery site in accordance with some embodiments of the present disclosure.

Referring now to FIG. 3, illustrated is an example flowchart for determining if a task is eligible for processing on a recovery site in accordance with some embodiments of the present disclosure. In some embodiments, the method 300 can be executed by one or more processors executing a set of instructions (e.g., processors 205 executing distribution instructions 264 as shown and described in FIG. 2). In some embodiments, the method 300 can be executed by a grid manager functioning in a network (e.g., grid manager 114 connected to network 100 as shown and described in FIG. 1).

The method 300 begins at operation 310. Operation 310 receives a request to process a task (e.g., from grid initiator 106 on behalf of application 104 of FIG. 1) related to at least one file stored in a production site (e.g., production site 110 of FIG. 1) and having a copy of the at least one file stored in a recovery site (e.g., recovery site 122 of FIG. 1). In some embodiments, the request can include a task name, task instructions, a file path to the file stored on the production site, and/or a file path to the copy of the file stored on the recovery site.

In operation 320, the method 300 can determine if the task is suitable for processing on the recovery site. For example, a task that is suitable for processing on the recovery site can exhibit one or more of the following characteristics: the task can be executed independent of user input during processing of the task, production site processing information is absent from the task (e.g., a serial number or physical location of resources to execute the task), the task is processed by reading data from one or more files and storing output data as a result file, the task does not alter the at least one file during processing of the task (e.g., delete the at least one file or modify contents of the at least one file), and the task output can be stored as one or more result files. As will be appreciated by one of skill in the art, more characteristics, fewer characteristics, or different characteristics than the previously mentioned characteristics can be evaluated to determine if a task is suitable for processing on the recovery site.

If operation 320 determines the task is not suitable for processing on the recovery site, the method 300 proceeds to operation 322 and executes the task using resources associated with the production site using the at least one file related to the task stored on the production site. After performing the task on the production site in operation 322, the method 300 can write the output to at least one result file in operation 360 and output the result file in operation 370. Operation 370 can further comprise confirming completion of the task by sending the location of the at least one result file to the requestor (e.g., grid initiator 106 on behalf of application 104 of FIG. 1).

If operation 320 determines the task is suitable for processing on the recovery site, then the method 300 proceeds to operation 330. Operation 330 determines if the at least one file stored in the production site and a copy of the at least one file stored in the recovery site match. In some embodiments, files can match if they are equivalent, or, in some embodiments, substantially identical. For example, two files can have similar content but one or more different metadata attributes. In such a case, the two files can be considered to match because the contents of the two files are equivalent even though one or more metadata attributes between the two files are not identical. In some embodiments, the files are determined to match by determining if a modification time of the at least one file stored on the production site is earlier than a copy time of the copy of the at least one file stored on the recovery site. The modification time can indicate the time the file was last updated. The copy time can indicate the time at which a copy operation to copy the at least one file from the production site to the recovery site began. In some embodiments, the files are determined to match by evaluating other characteristics of the file, such as, for example, the contents of the files, respective sizes of the respective files, or metadata associated with the files. In some embodiments where the copy time is later than the modification time, the files can further be determined to match by determining a difference between a current time and the copy time is above a time threshold. The time threshold can be, for example, an amount of time used to complete copying of a file from the production site to the recovery site.

In some embodiments, more than one copy of the file can be stored in the recovery site. For example, a first set of copies of the original data can be made at a first time in a first recovery server of the recovery site, and a second set of copies of the original data can be made at a second time in a second recovery server of the recovery site. In such embodiments, operation 330 can further comprise selecting a most recent copy of the at least one file from the plurality of copies of the at least one file.

If operation 330 determines the files do not match (e.g., the copy time is earlier than the modification time), then the method 300 proceeds to operation 322 and performs the task on the production site using the at least one file stored on the production site. The method 300 can then write the result to a result file in operation 360 and output the result file in operation 370.

If operation 330 determines the at least one file stored on the production site and the copy of the at least one file stored on the recovery site do match, then the method 300 can proceed to operation 340. Operation 340 can select resources on the recovery site to perform the task (e.g., specific servers in the recovery site). Operation 340 can select resources based on metrics such as, but not limited to, a processing utilization of respective recovery site resources, a network speed of respective recovery site resources, and/or a difference in time between a current time and a copy time of the at least one file.

The processing utilization can refer to a ratio of an amount of ongoing processing to an amount of processing capacity. An amount of processing can be measured using, for example, bytes, bytes per second, and/or hertz. A threshold processing utilization can be used to select candidate recovery site resources. For example, a resource on the recovery site having a processing utilization less than or equal to a processing utilization threshold comprising 80% can be selected as a candidate for performing the task. In some embodiments, a processing utilization score can be generated. For example, the score can be in the range from 0 to 100 and based on the processing utilization of a respective resource on the recovery site. A lower processing utilization can correspond to a higher score.

The network speed can be measured by transferring a test file to and/or from the resource on the recovery site via the network. In some embodiments, a network transfer speed threshold can be used such as, for example, 5 megabytes per second so that resources on the recovery site having a network transfer speed higher than 5 megabytes per second can be candidates for processing the task. In some embodiments, a network transfer speed score can be generated for respective resources on the recovery site. For example, the network transfer speed score can be in the range from 0 to 100 and based on the network transfer speed of respective resources on the recovery site. A faster network transfer speed can correspond to a larger score.

The difference in time between a current time and a copy time of the at least one file can be determined by subtracting the copy time from the current time. In some embodiments, a threshold time can be used to identify candidate resources on the recovery site. For example, the threshold time can correspond to a time greater than a time required to copy the at least one file from the production site to the recovery site. Thus, a respective resource having a difference in time between the current time and a copy time below the threshold time may indicate the copy operation is ongoing in the respective resource, and, therefore, the respective resource should not be selected as a candidate recovery site resource for executing the task. In some embodiments, a time score is generated. The time score can be based on the difference in time between a current time and a copy time of the copy of the at least one file. A larger difference in time can correspond to a larger time score.

Thus, the difference in time between a current time and a copy time can be used to determine the files match in operation 330 and/or to determine a score in operation 340 according to various embodiments.

In some embodiments, operation 340 selects a recovery site resource based on respective point scores such that the recovery site resource with the highest point score is selected to process the task. Respective recovery site resource point scores can be based on, for example, any one, or any combination of, the processing utilization score, the network transfer speed score, and the time score.

Operation 350 performs the task on the selected recovery site resource and using the copy of the file stored in the recovery site. Operation 360 writes the results of the processing to at least one result file and confirms completion of the task in operation 370 by outputting the at least one result file. In some embodiments, outputting the at least one result file can include sending the result file(s) or sending the file path(s) of the result file(s) to the requestor (e.g., grid initiator 106 on behalf of application 104 of FIG. 1) and/or storing the result file(s) in the recovery site (e.g., in temporary storage 134 of recovery site 122 of FIG. 1).

Figure 4:
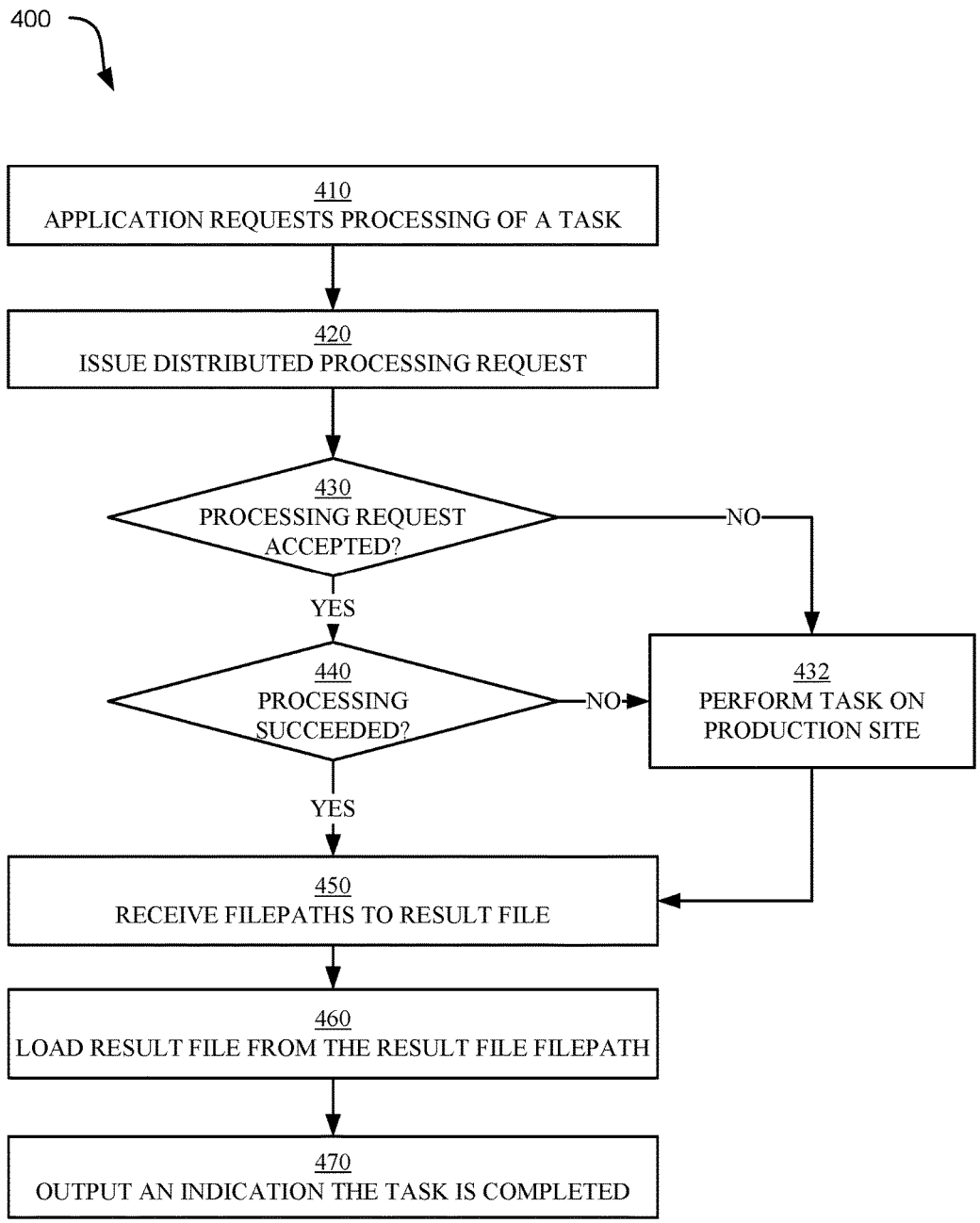
FIG. 4 illustrates an example flowchart for requesting distributed processing of a task on a recovery site in accordance with some embodiments of the present disclosure.

Referring now to FIG. 4, illustrated is an example flowchart for issuing a distributed processing request in accordance with some embodiments of the present disclosure. In some embodiments, the method 400 can be executed by one or more processors executing a set of instructions (e.g., processors 205 executing application instructions 262). In some embodiments, the method 400 can be executed by a grid initiator on behalf of an application functioning in a network (e.g., grid initiator 106 on behalf of application 104 connected to network 100).

The method 400 can start at operation 410. In operation 410, an application requests processing of a task. In some embodiments, the application can be a program operating on a workstation (e.g., application 104 of FIG. 1), and the application can request processing of a task in response to user input.

Operation 420 issues a distributed processing request. The request for distributed processing can indicate the task, at least one file path to at least one file related to the task stored on a production site, and/or at least one file path to a copy of the at least one file related to the task stored on the recovery site.

Operation 430 receives an indication that the processing request has been accepted for processing the task on the recovery site or that the processing request has been rejected for processing the task on the recovery site. The distributed processing request can be accepted or rejected based on, for example, operations 320 and 330 of FIG. 3. In some embodiments, an indication that the distributed processing request is rejected can further contain a reason the distributed processing request is rejected. For example, the request can be rejected because the task requests user input, because the request defines a location for processing the task, and/or because the request alters a file associated with the request.

In the event the distributed processing request is rejected in operation 430, the method 400 proceeds to operation 432 and performs the task on the production site. Afterward, the method 400 can proceed through operations 450-470 to complete processing of the task as described in further detail hereinafter.

In the event the distributed processing request is accepted in operation 430, the method 400 proceeds to operation 440. Operation 440 receives an indication indicating whether the processing of the task on the recovery site has succeeded or failed. In the event operation 440 receives an indication that the processing of the task on the recovery site has failed, the method 400 proceeds to operation 432 and performs the task on the production site. Afterward, the method 400 can proceed through operations 450-470 to complete processing of the task as described in further detail hereinafter.

In the event operation 440 receives an indication that processing the task on the recovery site has succeeded, the method 400 proceeds to operation 450. In operation 450, one or more file paths to one or more result files generated by processing the task are received. In some embodiments, in which the task is processed on the recovery site, the one or more result files are stored in a temporary storage of the recovery site (e.g., temporary storage 134 of FIG. 1). In operation 460, the one or more result files are retrieved using the one or more file paths and loaded into a local memory. In operation 470, the downloaded result files are read, and the method 400 outputs an indication that the task is completed. In some embodiments, the method 400 reads the downloaded result files to verify the task was completed. In some embodiments, the downloaded result files contain further instructions such as, but not limited to, replacing one or more files on the production site with one or more result files.

Figure 5:
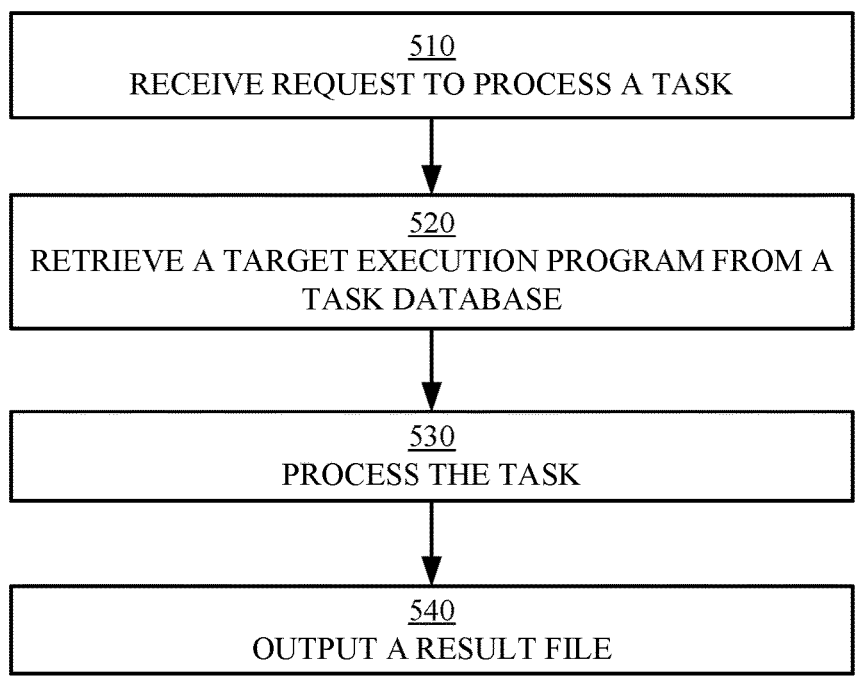
FIG. 5 illustrates an example flowchart for executing a task using a recovery site in accordance with some embodiments of the present disclosure.

Referring now to FIG. 5, illustrated is an example flowchart for executing a task on a recovery site in accordance with some embodiments of the present disclosure. In some embodiments, the method 500 can be executed by one or more processors executing a set of instructions (e.g., processors 205 implementing execution instructions 266 of FIG. 2). In some embodiments, the method 500 can be implemented by a grid target functioning in a network (e.g., grid target 126 of FIG. 1).

The method 500 can start at operation 510. In operation 510, the method 500 receives a request to process a task. The request to process the task can indicate one or more of a type of processing task, a plurality of sub-tasks associated with the task, a file path to at least one file stored on a production site and related to the task, and/or a file path to at least one file stored on the recovery site and related to the task.

Operation 520 retrieves a target execution program from a task database (e.g., task database 240 of FIG. 2). The target execution program can be a program configured to execute the task based on the task name and using resources available on the recovery site. The task database can indicate a suitable execution program of the task based on, for example, a type of task indicated in the request, program instructions associated with the task in the request, and/or file characteristics of the files associated with the task.

Operation 530 processes the task by implementing the target execution program using the copy of the at least one file. In some embodiments, intermediate files are generated during processing of the task and the intermediate files can be temporarily stored in a temporary storage on the recovery site (e.g., temporary storage 134 of FIG. 1).

Operation 540 outputs at least one result file in response to processing the task. In some embodiments, outputting the at least one result file includes storing the at least one result file in a temporary storage on the recovery site (e.g., temporary storage 134) and sending a file path corresponding to the at least one file to a requestor responsive to the request to process the task (e.g., grid manager 114 and/or grid initiator 106 of FIG. 1).

Figure 6:
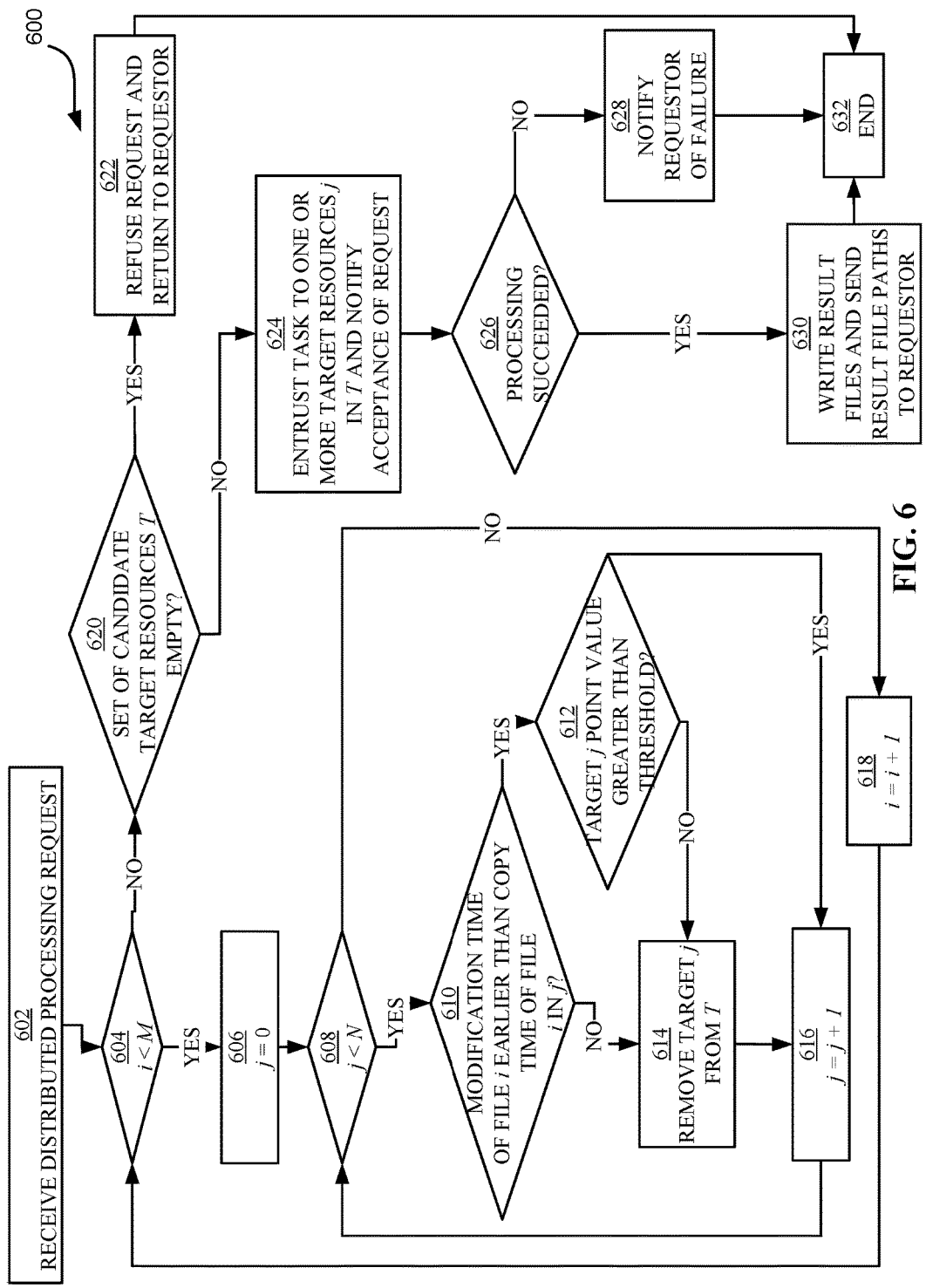
FIG. 6 illustrates an example flowchart for processing a distributed processing request in accordance with some embodiments of the present disclosure.

Referring now to FIG. 6, illustrated is an example flowchart for processing a distributed processing request in accordance with some embodiments of the present disclosure. In some embodiments, the method 600 can be executed by one or more processors executing a set of instructions (e.g., processors 205 executing instructions 260 of FIG. 2). In some embodiments, the method 600 is implemented by a grid manager connected to a production site and a recovery site via a network (e.g., grid manager 114 connected to production site 110 and recovery site 122 via network 100 of FIG. 1).

The method 600 can start at operation 602. In operation 602, a distributed processing request is received. The distributed processing request can contain file paths to one or more files stored on a production site and related to a task. The one or more files can be represented by a positive, variable integer M files. A generic file can be annotated as i, and respective files can be identified by an index of files ranging from $i_0$ to $i_{M-1}$. The distributed processing request can be received with $i=i_0$ such that the first file of the one or more files is initially selected.

Operation 604 determines if i is less than M. Thus, operation 604 determines if all files i have been evaluated in operations 606-618. In the event i is not less than M, then the method 600 proceeds to operation 620 as will be discussed later. In the event i is less than M, then the method 600 proceeds to operation 606. Operation 606 sets j=0 where j indicates a generic target resource in a recovery site containing N target resources. The N respective target resources can be identified by an index of target resources ranging from $j_0$ to $j_{N-1}$. The N respective target resources can be stored as a set of candidate target resource T.

Operation 608 determines if j is less than N. Thus, operation 608 determines if all target resources j have been evaluated for a selected file i in operations 610-616. In the event operation 608 determines j is less than N, then the method 600 proceeds to operation 610 and determines if a modification time of file i stored in the production site is earlier than a start time of a last copy function copying the file i from the production site to the target resource j.

In the event the modification time of file i is not earlier than the copy time of file i in target resource j, then the method 600 proceeds to operation 614. Operation 614 removes target resource j from the set of candidate target resources T. In operation 616, the method 600 iterates to a next target resource and proceeds again to operation 608. In the event operation 610 determines the modification time of file i stored in the production site is earlier than the copy time of file i in target resource j, then the method 600 proceeds to operation 612.

Operation 612 determines if target resource j has a point value above a point value threshold. Thus, operation 612 can further comprise calculating a point value for target resource j. Point values have been previously described in more detail with respect to operation 340 of FIG. 3. As previously described, a calculated point value can be based on one or more metrics such as, but not limited to, a processing utilization, a network speed, and a time value comprising a difference between a current time and a copy time of a file i stored on the target resource j. The point value threshold can be based on user input or automatically generated. Automatically generated point value thresholds can be based on historical data according to some embodiments.

In the event operation 612 determines target resource j does not have a point value above the point value threshold, then the method 600 proceeds to operation 614 and removes target resource j from the set of candidate target resources T. In the event operation 612 determines target resource j has a point value above the point value threshold, then the method 600 proceeds to operation 616 and iterates to a next target resource and proceeds again to operation 608. As will be appreciated by one of skill in the art, in some embodiments, operations 612 and 614 can also be configured to populate an initially empty set of candidate target resources T with suitable target resources j based on acceptable point values above the point value threshold (i.e., as opposed to removing unsuitable target resources j from an initially full set of candidate target resource T).

Referring again to operation 608, in the event operation 608 determines j is not less than N, then the method 600 proceeds to operation 618. Operation 618 iterates to a next file i and proceeds again to operation 604.

In the event operation 604 determines that i is not less than M (i.e., that all files associated with the task have been evaluated in operations 606-618), then the method 600 proceeds to operation 620. Operation 620 determines if the set of candidate target resources T is empty. If the set of candidate target resources T is empty, then the method 600 proceeds to operation 622 and refuses the request for distributed processing. Refusing the request for distributed processing can comprise sending an indication that the request has been refused to a requestor (e.g., grid initiator 106 on behalf of application 104 of FIG. 1). In some embodiments, the indication that the request has been refused further indicates a reason that the request has been refused. The method 600 can then end in operation 632.

If operation 620 determines the set of candidate target resources T is not empty, then the method 600 can proceed to operation 624 and entrust processing the task, or portion thereof, to one or more target resources in the set of candidate target resources T. In embodiments where the set of candidate target resources T contains more than one target resource j, a respective target resource j can be chosen for processing the task based on secondary factors such as, but not limited to, the respective point values of the respective target resources j in the set of candidate target resources T. Operation 624 can further comprise indicating that the distributed processing request has been accepted. Accepting the distributed processing request can comprise sending an indication that the request has been accepted to a requestor (e.g., grid initiator 106 on behalf of application 104 of FIG. 1).

The method 600 can then proceed to operation 626 and determine if processing the task, or portion thereof, in target resource j succeeded. In some embodiments, processing the task succeeds if the task is completed without error and/or if the task is completed within a selected amount of time. If the processing did not succeed, the method 600 can proceed to operation 628 and send a notification that the processing failed by sending the notification to the requestor (e.g., grid initiator 106 on behalf of application 104 of FIG. 1). The method 600 can then end in operation 632.

In the event operation 626 determines that the processing succeeded, the method 600 can proceed to operation 630 and write the result to one or more result files and send the one or more result file paths to the requestor (e.g., grid initiator 106 on behalf of application 104 of FIG. 1). The method 600 can then end in operation 632.

As will be appreciated by one of skill in the art, the method 600 can contain numerous variations while remaining within the spirit and scope of the present disclosure. For example, in some embodiments, operation 610 is performed for each file i, and then operation 612 is performed for each target resource j determined to store a file i with a copy time later than the modification time of file i.

Furthermore, operation 620 can, in some embodiments, identify sub-tasks associated with the task received in operation 602 and one or more respective files i associated with respective sub-tasks. Thus, in some embodiments, operation 620 processes a portion of the task in operation 624 and refuses another portion of the task in operation 622 based on respective sets of candidate target resources T generated for respective files i associated with respective sub-tasks. In some embodiments, different sub-tasks can be performed on different target resources.

Further still, in some embodiments, any target resource j satisfying both operations 610 and operation 612 (i.e., a target resource j storing a copy of file i with a copy time later than the modification time of file i and a point value greater than a threshold point value) can proceed immediately to operation 624 and process the task, or a portion of the sub-task, on the target resource j.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A computer-implemented method comprising:
  receiving a request to perform a task indicating at least a first file used to perform the task, wherein the first file is modified at a first update time and is stored on a production site comprising hardware resources configured to store original data and process tasks associated with the original data, and wherein a first copy of the first file is created at a first copy time and stored on a recovery site comprising hardware resources configured to store copies of the original data and process tasks associated with the copies of the original data;
  determining the task is a candidate for processing on the recovery site by:
    determining that processing the task comprises reading the first file and creating a result file based on the first file;
    determining that processing the task can be completed without user input;
    determining that the task does not define a physical location for processing the task; and
    determining that the task does not alter the first file as a result of performing the task;
  determining the first file and the first copy of the first file match by determining the first update time is earlier than the first copy time, wherein determining the first file and the first copy of the first file match further comprises:
    determining a first difference between a current time and the first copy time is above a time threshold, wherein the first copy time indicates a time the first copy of the first file began to be created, wherein the time threshold comprises an amount of time greater than an amount of time used to create the first copy of the first file;
  performing the task using resources of the recovery site and using the first copy of the first file stored in the recovery site in response to determining that the first file and the first copy of the first file match, wherein performing the task further comprises:
    selecting a first resource on the recovery site for processing the task based on the first resource having a first processing utilization below a processing utilization threshold, wherein the first processing utilization comprises an ongoing processing amount in the first resource divided by a processing capacity amount of the first resource, wherein the processing utilization threshold comprises 80%;
    selecting the first resource on the recovery site for processing the task further based on the first resource having a first network speed above a network speed threshold, wherein the first network speed is calculated by sending a test file from the first resource to a second resource connected to the first resource via a network and measuring a transfer speed of the test file, wherein the network speed threshold comprises five megabytes per second; and
    storing a result file in the recovery site in response to performing the task; and
  outputting a file path in response to performing the task, wherein the file path indicates a location of the result file stored in the recovery site.

* * * * *